US009908262B2

(12) United States Patent
Mikulak et al.

(10) Patent No.: US 9,908,262 B2
(45) Date of Patent: *Mar. 6, 2018

(54) MATERIALS FOR POWDER-BASED ADDITIVE MANUFACTURING PROCESSES

(71) Applicant: Structured Polymers, Inc., Austin, TX (US)

(72) Inventors: James Mikulak, Austin, TX (US); Carl Deckard, Austin, TX (US); Vikram Devaraj, Austin, TX (US)

(73) Assignee: Structured Polymers, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/631,689

(22) Filed: Jun. 23, 2017

(65) Prior Publication Data

US 2017/0305036 A1 Oct. 26, 2017

Related U.S. Application Data

(63) Continuation of application No. 14/426,891, filed as application No. PCT/US2013/030073 on Mar. 9, 2013, now Pat. No. 9,718,218.

(60) Provisional application No. 61/610,605, filed on Mar. 14, 2012.

(51) Int. Cl.
| B29B 9/06 | (2006.01) |
| D01F 8/12 | (2006.01) |
| D01D 5/34 | (2006.01) |
| B33Y 40/00 | (2015.01) |
| D01F 8/04 | (2006.01) |
| B29B 9/16 | (2006.01) |
| B29C 67/00 | (2017.01) |
| B29L 31/00 | (2006.01) |
| B33Y 70/00 | (2015.01) |
| B29B 9/12 | (2006.01) |

(52) U.S. Cl.
CPC .............. B29B 9/06 (2013.01); B29B 9/16 (2013.01); B33Y 40/00 (2014.12); D01D 5/34 (2013.01); D01F 8/04 (2013.01); D01F 8/12 (2013.01); *B29B 2009/125* (2013.01); *B29C 67/0077* (2013.01); *B29L 2031/756* (2013.01); *B33Y 70/00* (2014.12); *Y10T 428/2982* (2015.01)

(58) Field of Classification Search
CPC ....... B29B 9/06; B29B 9/16; B29B 2009/125; B33Y 40/00; B33Y 70/00; D01D 5/34; D01F 8/04; D01F 8/12; Y10T 428/2982
USPC ........................................................ 428/402
See application file for complete search history.

(56) References Cited

U.S. PATENT DOCUMENTS

| 4,247,508 A | 1/1981 | Housholder |
| 4,863,538 A | 9/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,053,090 A | 10/1991 | Beaman et al. |
| 5,076,869 A | 12/1991 | Bourell et al. |
| 5,132,143 A | 7/1992 | Deckard |
| 5,155,324 A | 10/1992 | Deckard et al. |
| 5,296,062 A | 3/1994 | Bourell et al. |
| 5,316,580 A | 5/1994 | Deckard |
| 5,342,919 A | 8/1994 | Dickens, Jr. et al. |
| 5,382,308 A | 1/1995 | Bourell et al. |
| 5,527,877 A | 6/1996 | Dickens, Jr. et al. |
| 5,597,589 A | 1/1997 | Deckard |
| 5,616,294 A | 4/1997 | Deckard |
| 5,639,070 A | 6/1997 | Deckard |
| 5,648,450 A | 7/1997 | Dickens, Jr. et al. |
| 5,733,497 A | 3/1998 | McAlea et al. |
| 5,990,268 A | 11/1999 | Dickens, Jr. et al. |
| 6,136,948 A | 10/2000 | Dickens, Jr. et al. |
| 6,245,281 B1 | 6/2001 | Scholten et al. |
| 8,801,990 B2 * | 8/2014 | Mikulak ............. B29C 47/0014 264/255 |
| 8,920,697 B2 * | 12/2014 | Mikulak ............... B29C 47/025 264/255 |
| 9,718,218 B2 * | 8/2017 | Mikulak ................... B29B 9/06 |
| 2004/0131853 A1 * | 7/2004 | Mushiake ................. B29B 9/06 428/402.22 |
| 2005/0080191 A1 * | 4/2005 | Kramer ..................... C08F 8/00 525/191 |
| 2010/0038807 A1 * | 2/2010 | Brodkin ............. A61C 13/0003 264/17 |
| 2011/0052927 A1 | 3/2011 | Martinoni et al. |
| 2013/0224423 A1 | 8/2013 | Mikulak et al. |
| 2014/0141166 A1 | 5/2014 | Rodgers |
| 2014/0314964 A1 | 10/2014 | Ackelid |

(Continued)

FOREIGN PATENT DOCUMENTS

| CN | 103709737 A | 4/2014 |
| WO | 2013090174 A1 | 6/2013 |
| WO | 2017112723 A1 | 6/2017 |

OTHER PUBLICATIONS

J.-P. Kruth et al., "Consolidation of Polymer Powders by Selective Laser Sintering," <<http://www.academia.edu/8286626/PMI08_Kruth_Levy_Keynote>>, downloaded Jul. 24, 2015, 16 pages.

(Continued)

Primary Examiner — Leszek Kiliman
(74) Attorney, Agent, or Firm — Abel Law Group, LLP

(57) ABSTRACT

A multi-component micro-pellet useful as a consumable material for making objects by powder based additive manufacturing is disclosed. A method of making said micro-pellet is also disclosed. An object made by using said micro-pellets is also disclosed.

20 Claims, 2 Drawing Sheets

(56) References Cited

U.S. PATENT DOCUMENTS

2015/0218360 A1 8/2015 Barber et al.
2015/0336292 A1 11/2015 Mikulak et al.

OTHER PUBLICATIONS

International Search Report and Written Opinion for PCT Application No. PCT/US2016/067911, dated Apr. 10, 2017, 10 pages.

* cited by examiner

MATERIALS FOR POWDER-BASED ADDITIVE MANUFACTURING PROCESSES

CROSS-REFERENCE TO RELATED APPLICATIONS

This application is a continuation of and claims priority under 35 U.S.C. § 120 to U.S. patent application Ser. No. 14/426,891, entitled "MATERIALS FOR POWDER-BASED ADDITIVE MANUFACTURING PROCESSES," by James Mikulak et al., filed Mar. 9, 2015, which claims priority under 35 U.S.C. § 120 to International Application No. PCT/US2013/030073, entitled "MATERIALS FOR POWDER-BASED ADDITIVE MANUFACTURING PROCESSES," by James Mikulak et al., filed Mar. 9, 2013, which claims priority under 35 U.S.C. § 119(e) to U.S. Provisional Patent Application No. 61/610,605, entitled "MATERIALS FOR POWDER-BASED ADDITIVE MANUFACTURING PROCESSES," by James Mikulak et al., filed Mar. 14, 2012, all applications of which are assigned to the current assignee hereof and incorporated herein by reference in their entireties.

TECHNICAL FIELD

The present disclosure is directed to materials for use in additive manufacturing processes. In particular, the present disclosure is directed to materials for use in powder-based additive manufacturing processes.

BACKGROUND ART

Additive Manufacturing consists of several processes that produce solid three dimensional (3D) objects from a computer model by building up the object in a layer-by-layer manner. Powder-based Additive Manufacturing processes use powders as the consumable materials, where the powders are deposited and then modified. For example, a layer of powder may be deposited and then modified by selected exposure to electromagnetic radiation, or selected deposition of liquid, which may be followed by exposure to electromagnetic radiation, or electron beam.

One example of a powder-based additive manufacturing process is the selective laser sintering process. In the selective laser sintering process a part is constructed one layer at a time inside a thermally controlled process chamber, which is held a temperature slightly below the melting point of the polymer system being used. A laser beam is raster scanned across the surface of a layer of powder, turning on and off to selectively sinter or fuse the polymer powder particles into a shape defined by a computer which has converted a 3D CAD image into profile slices equal in thickness to the powder layer thickness.

The powder is deposited in thin layers, in the range of approximately 0.05 to 0.30 millimeters deep, uniformly across a piston. After a given layer has been fused, the piston is lowered and a new layer of powder is added on top of the just completed layer. The new layer is then fused, based on the defined shape, and in this manner a three-dimensional object can be fabricated from multiple layers.

In Selective Beam Sintering, the powder is deposited then scanned by a directed energy beam. The energy beam is most commonly a laser but electron beams are also used. In Selective Inhibition Sintering, the powder is deposited, a sintering inhibiter is then selectively deposited, and the powder is then exposed to electromagnetic radiation. In High Speed Sintering, the powder is deposited and then a radiation absorbing liquid is selectively deposited and then the powder is exposed to electromagnetic radiation. In 3D Printing, the powder is deposited and then a binder is selectively deposited. In a mask based process, the powder is deposited and then the powder is exposed to electromagnetic radiation through a mask. In Laser Engineered Net Shaping, the powder is entrained in a gas jet at the same time as the energy beam is applied.

DISCLOSURE OF INVENTION

Technical Problem

Conventional powder-based materials currently used in powder-based additive manufacturing processes are typically precipitated from solution or ground from pellets. Both methods are expensive and work only with a limited number of polymers. Additive packages are substantially limited in some cases to being only thinly coated layers applied by means of mechanical mixing or coating. These limits, result in corresponding limits in the types of polymeric materials that may be used with commercial success in powder-based additive manufacturing processes. As such, there is a need for new powder-based materials that increase the type and variety of polymeric materials used in powder-based additive manufacturing processes.

Technical Solution

This invention is directed to powder-based materials for use in powder-based additive manufacturing processes. As discussed below, the powder-based materials include multi-component micro-pellets, which increase the type, variety and combinations of polymer materials that can be successfully used in powder-based additive manufacturing processes.

The powder-based materials may be used in any suitable powder-based additive manufacturing process. Examples of suitable powder-based additive manufacturing processes include selective laser sintering, selective inhibition sintering, high speed sintering, and other 3D printing processes that construct parts using deposited powders as a feed material in an additive layer-by-layer manner, including mask based sintering process. For example, the powder-based materials may be used in a selective laser sintering system, such as disclosed in Deckard, U.S. Pat. No. 5,132,143.

The process for manufacturing the powder-based materials of this invention involves forming multi-component fibers from multiple polymer pellets, and then reducing the size of the fibers (e.g., cutting the fibers) to form micro-pellets. In one embodiment, the process includes the steps disclosed in Deckard, U.S. Pat. No. 7,794,647, which is incorporated by reference.

As shown in FIG. 1, the process for manufacturing the powder-based materials initially involves converting multiple polymer feed materials, such as feed materials 10 and 12, into one or more fibers having a shell-core arrangement. For example, feed materials 10 and 12, which may be polymer pellets, may be co-extruded to form fiber 14 having shell portion 16 and core portion 18. In the shown example, feed materials 10 and 12 are compositionally different from each other, where feed material 10 is used to form shell portion 16, and feed material 12 is used to form core portion 18. In alternative embodiments, the shell-core fibers may be derived from three or more feed materials.

The step of converting feed materials 10 and 12 into fiber 14 include the sub-steps of spinning (i.e., extruding and solidifying the polymers), and optionally, drawing fiber 14, which consists of stretching fiber 14 to orient the polymeric molecular structure. Fiber 14 may also be heat set, which crystallizes the polymers at a controlled temperature while allowing a controlled amount of contraction in the axial dimension.

Controlling the parameters while creating fiber 14 from pellets 10 and 12 allows a manufacturer to control the development of the microstructure of the polymers in shell portion 16 and in core portion 18. Many properties of the resulting fiber 14 are dependent on the final the microstructure of fiber 14, including, but not limited to, the melting behavior of the polymers. Controlling the melting behavior of the polymers effectively increase the range of the temperature window of the Selective Laser Sintering process. A larger temperature window leads to a more forgiving process, higher yields, better 3D objects, and better throughput.

Suitable average diameters for fiber 14, referred to as diameter 20, range from about 10 microns to about 250 microns. In some embodiments, shell portion 16 at least partially encases core portion 18. In further embodiments, shell portion 16 completely encases core portion 18. In one embodiment, shell portion 16 has an average volume ranging from about 5% to about 50% of an average volume of fiber 14.

The terms 'core portion' and 'shell portion' of a fiber (e.g., fiber 14) refer to relative locations of the portions along a cross-section of the fiber that is orthogonal to a longitudinal length of the fiber, where the core portion is an inner portion relative to the shell portion. Additionally the term 'core portion' and 'shell portion' can be applied to the resulting micro-pellets created after the fiber undergoes the size reduction step, as discussed below. Unless otherwise stated, these terms are not intended to imply any further limitations on the cross-sectional characteristics of the portions.

While fiber 14 is illustrated with a shell-core arrangement having shell portion 16 extending around an outer perimeter of core portion 18, in other embodiments, the shell-core arrangement for fiber 14 may have any suitable bi-component fiber arrangement, such as those produced by Hills Inc., of Melbourne Fla. Example geometries include islands in the sea, wedges, wedges with hollow core, stripes, concerted rings (multi shell/core), snow flake and logo fibers. Most commonly, the cross-sections of these bi-component fibers is generally uniform along the length of the fiber but fibers of varying cross-section may also be utilized.

Additionally, core portion 18 may vary from the embodiment shown in FIG. 1. For example, in some embodiments, the core portions may be located off-axis from the central axis of fiber 14. In additional alternative embodiments, the geometries of core portion 18 may be non-cylindrical (e.g., oval, rectangular, triangular, and the like), and/or hollow to modify the physical characteristics of the resulting extruded and drawn fiber 14, and thus, the resulting micro-pellets 22, and resulting 3D object (not shown in FIG. 1) that are produced when the micro-pellets 22 are used by powder-based, additive manufacturing systems.

After fiber 14 is formed, micro-pellets 22 may then be formed from fiber 14 with a size-reducing process. In one embodiment, fiber may be size reduced by cutting fiber 14 to lengths, as illustrated by cut lines 24 along fiber 14, creating substantially-cylindrical shaped micro-pellets 22, each having a ratio between the length of the micro-pellet 22 (referred to as length 26) and the diameter of the micro-pellet 22 (same as diameter 20). Examples of suitable ratios between length 26 and diameter 20 range from about 1:2 to about 3:1.

In some embodiments, micro-pellets 22 may be tumbled as an additional step to round the edges of micro-pellets 22. In other embodiments, rounding may be accomplished by other mechanical means.

In alternative embodiments, the size reduction step is accomplished by grinding, crushing or fracturing. Furthermore, the size reduction step may also be accomplished by selectively dissolving a portion of fiber 14. In another embodiment, the fiber 14 may be initially cut and then ground using conventional grinding techniques.

In a further embodiment, multiple fibers 14 are aggregated to a tow or yarn prior to the size reduction step. In another embodiment, multiple fibers 14 are aggregated into a tow or yarn, and further at least partially encased in a sacrificial material to aid in the size reduction step. In this embodiment, the sacrificial material is removed after the size reduction step. The sacrificial material may be a water soluble polymer or other polymer that can be dissolved in a solvent without creating deterioration to the shell and core materials.

After the size reduction step, the resulting micro-pellets 22 have cross-sectional dimensions corresponding to those of shell portion 16 and core portion 18. Accordingly, each micro-pellet 22 has a shell portion 28 and a core portion 30. In alternative embodiments, fiber 14 and micro-pellets 22 may have three or more portions.

Advantageous Effects

Another aspect of this invention is better control of the size and size distribution of the resulting micro-pellets 22. By selecting appropriate combinations of fiber diameter 20 and cutting aspect ratio as defined above, the resulting size of micro-pellets 22 can be closely controlled. The quality and mechanical properties of 3D objects created by using polymers in powder-based additive manufacturing processes have been shown to be dependent on the size and size distribution of the powders used in the process. This invention allows for good customization and control of both the size of the resulting micro-pellets 22 and their size distribution. In one embodiment, a single modal size distribution is used. In another embodiment, a bi-modal or higher size distribution is used.

As discussed above, the materials of shell portions 16 and 28 (shell material) and core portions 18 and 30 (core material) are compositionally different. In some embodiments, the core and shell materials each include one or more semi-crystalline base polymers and, optionally, one or more additives. For example the one or more additives or modifiers may be incorporated in varying amounts to modify the mechanical, electrical, magnetic, thermodynamic, processing aesthetic or biocompatibility properties of the base polymers. In alternative embodiments, the core and shell materials each include one or more amorphous base polymers and, optionally, one or more additives.

Examples of suitable semi-crystalline base polymers for use in each of the core and shell materials include polyamides, polyethylenes, polypropylenes, polyetheretherketones, polyoxymethylene acetals, polytetrafluoroethylenes, polypheneylene sulfides, polybutylene terephthalates, copolymers thereof, and combinations thereof. Suitable polyamides include aliphatic nylon polyamides, such as nylon 6, nylon 6-6, nylon 6-10, nylon 6-12, nylon 10, nylon 10-10, nylon 11, nylon 12, and combinations thereof.

Suitable polyethylenes include low-density polyethylene, medium-density polyethylene, high density polyethylene, and combinations thereof. Suitable polypropylenes include isotactic polypropylenes, syndiotactic polypropylenes, branched and linear variations thereof, and combinations thereof. Unless indicated otherwise, the base polymers for the core and shell materials are not intended to be limited to these listed polymers.

Examples of suitable additives and modifiers include coloration inhibitors, lubricants, nucleating agents, viscosity thickeners, antioxidants, antistatic agents, bio-degradative agents, biocompatibility agents, bio-preservatives, colorants, fragrances, and stabilizers against hydrolysis, thermal degradation or UV degradation, mineral fillers, glass or carbon fibers, lubricants to improve wear and friction, plasticizers, fire retardants, electrically conductive materials, and other polymers to toughen or otherwise affect the base polymer.

In some embodiments, the shell and core materials may be polymers from different polymer families. In other embodiments the shell and core materials may be polymers from the same polymer families, but with different molecular weight distributions. In yet other embodiments, the shell and core materials may be from the same polymer families, but with different structures, such as different types of branching, different levels of branching, isotactic or atactic iso-chemistry, random co-polymer or block copolymer arrangement, or different levels of side group substitution. In other embodiments, the shell and core materials may be polymers from the same polymer families, but with different additives such as nucleated grades or non-nucleated grades, filled grades or un-filled grades, or other additives in one material and not in the other.

For example, the shell and core materials may be selected to have the same base semi-crystalline polymer, with the shell material including the base polymer with addition of a nucleating agent to modify or raise the re-crystallization temperature of shell portion 16 relative to core portion 18. The micro-pellets 22 created from fiber 14 thus retain a shell portion 28 and core portion 30 with the same modified re-crystallization temperatures.

These types of melting point modifications are desirable in semi-crystalline polymers intended for use in powder-based additive manufacturing processes since they allow step-wise or two-stage re-crystallization of the materials. This minimizes shrinkage of the process build bed, both prior to the beginning of the build, when the process bed is being brought up to temperature, and after the commencement of the build. The higher strength and higher temperatures semi-crystalline powders such as polyetheretherketone have proven difficult to process using the powder-based additive manufacturing process because of their higher shrinkage rates. As such, two-stage crystallization desirably reduces distortions, internal stress and cracking when processing the higher strength, higher temperature semi-crystalline polymers. In an alternative embodiment, the core and shell materials may be reversed to have the nucleated polymer in the core portions 18 and 30 and the non-nucleated polymer in the shell portions 16 and 28.

In one embodiment, shell portion 16 and core portion 18 are selected to have a combination of high stiffness as determined by an appropriate elastic modulus, and core portion 16 is selected to have high toughness as determined by a Charpy or Izod impact test. By selecting the core and shell materials for different properties, in this case stiffness and toughness, the resulting part that is formed by using micro-pellets 22 in a powder-based additive manufacturing process can have a tuned or optimized set of properties to meet specified performance requirements not achievable by other available feed stock for powder-based additive manufacturing processes.

In an alternative embodiment the shell and core materials in the above may be reversed to have the stiff component in the core portions 18 and 30, and the tough component in the shell portions 16 and 28. In yet other alternative embodiments, other pairs or sets of materials can be selected for differing portions of micro-pellet 22. This allows the final 3D object to be built from the micro-pellets 22 using one of the powder-based additive manufacturing processes or systems with a desirable mix of properties.

In another embodiment, the shell and core materials are selected to provide a trade-off between a given mechanical, electrical or magnetic property and cost. For example the shell material can be selected for high stiffness as described above while the core material can be selected for low cost, allowing the development of micro-pellets 22 that provides the final 3D object after being processed using one of the powder-based additive manufacturing processes with the stiffness required by the application at a minimum cost.

The shell materials and/or the core materials may also include additional additives. In many cases, this is preferable to having additives throughout the particle. For example, in many cases, additives are needed at the surface of the particle but not in the middle of the particle, such as flame retardant in the shell material, conductive filler in the shell material (e.g., for anti-static, emf shielding, and radar absorption), heat stabilizers in the shell material, light stabilizers in the shell material, and the like.

As shown in FIG. 2, the resulting micro-pellets 22 formed from one or more fibers 14 may then be fed to a powder-based additive manufacturing system (e.g., system 32) as powder-based materials. Using micro-pellets 22, system 32 may then build 3D objects (e.g., 3D object 34) in a layer-by-layer manner, where the build parameters may be modified to accommodate the different compositions of the shell and core materials of micro-pellets 22. As mentioned above, this increases the type and variety of polymer materials that can be successfully used in powder-based additive manufacturing processes.

Although the present disclosure has been described with reference to preferred embodiments, workers skilled in the art will recognize that changes may be made in form and detail without departing from the spirit and scope of the disclosure.

Figure 1:
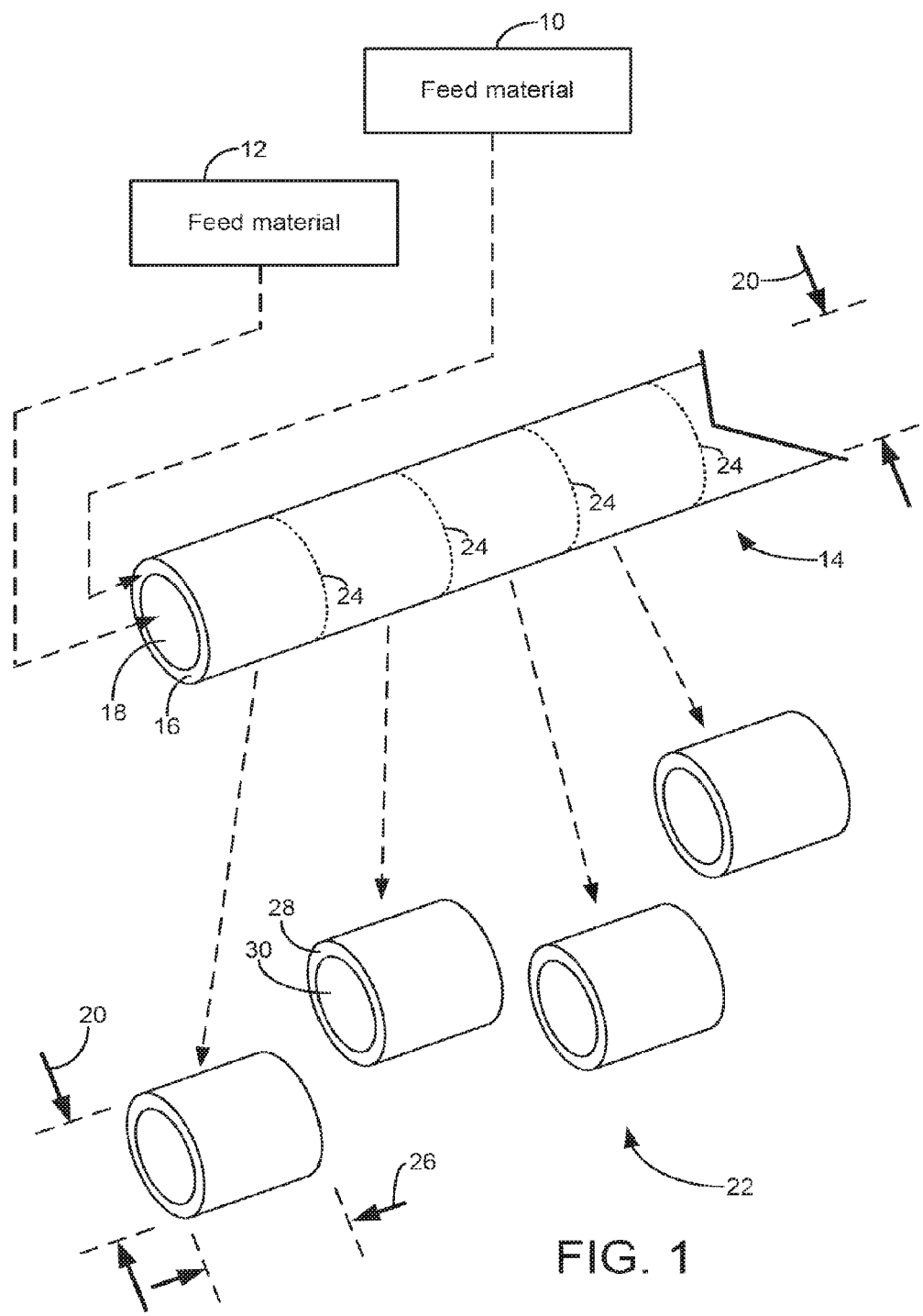
FIG. 1 is a schematic illustration of a process for manufacturing powder-based materials.
Figure 2:
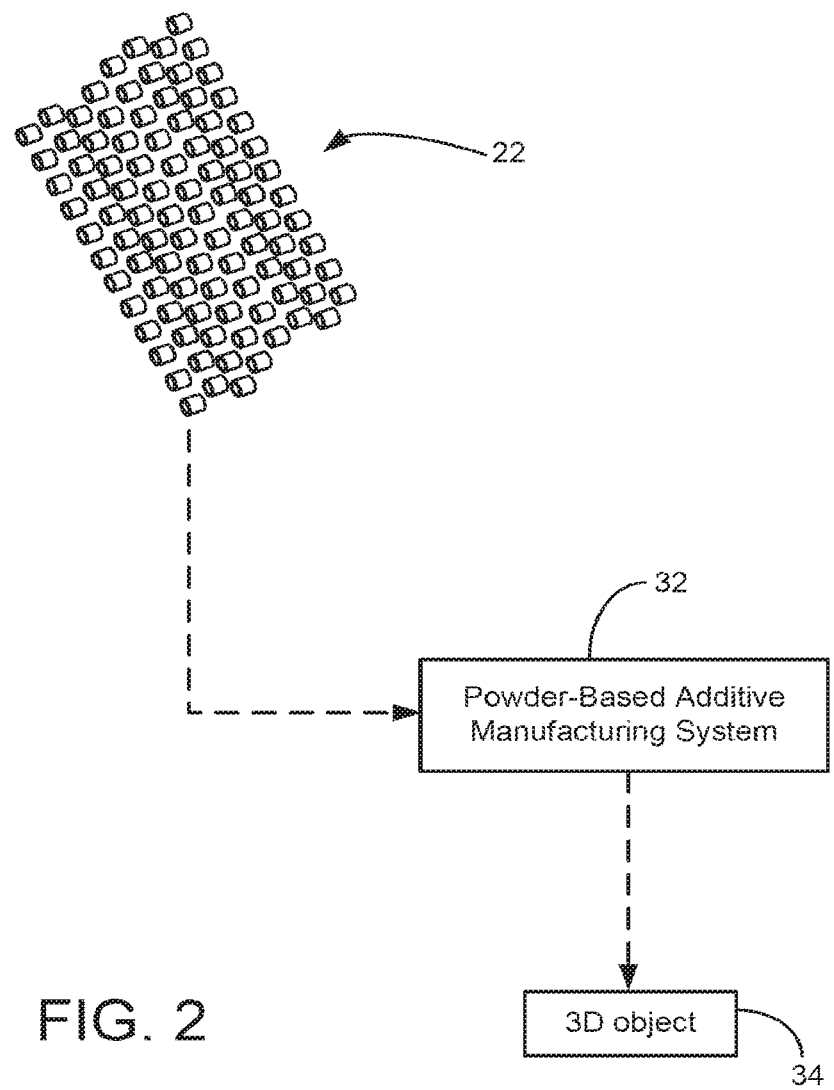
FIG. 2 is a schematic illustration of a process for building 3D objects with the powder-based materials using a powder-based additive manufacturing process.

What is claimed is:

1. A consumable multi-component micro-pellet for use in a powder-based additive manufacturing system, the consumable multi-component micro-pellet comprising at least two distinct components and having an average cross-sectional diameter ranging from 10 microns to 250 microns.

2. The consumable multi-component micro-pellet of claim 1, wherein the multi-component consumable micro-pellet is configured to be melted and used to form a plurality of solidified layers of a three-dimensional object.

3. The consumable multi-component micro-pellet of claim 1, wherein the at least two distinct components are two distinct compositional components.

4. The consumable multi-component micro-pellet of claim 1, wherein the two distinct components are two distinct structural components.

5. The consumable multi-component micro-pellet of claim 1, wherein the two distinct components comprise distinct mechanical, electrical, magnetic, thermodynamic, processing, aesthetic or biocompatibility properties.

6. The consumable multi-component micro-pellet of claim 4, wherein the at least two distinct components comprises a first component comprising a first thermoplastic material.

7. The consumable multi-component micro-pellet of claim 6, wherein the first thermoplastic material comprises a first semi-crystalline polymeric material selected from a group of semi-crystalline polymers consisting of polyamides, polyethylenes, polypropylenes, polyetheretherketones, olyoxymethylene acetals, polytetrafluoroethylenes, polypheneylene sulfides, polybutylene terephthalates, copolymers thereof, and combinations thereof.

8. The consumable multi-component micro-pellet of claim 6, wherein the first thermoplastic material comprises a first polyamide material selected from a group of polyamide polymers consisting of nylon 6, nylon 6-6, nylon 6-10, nylon 6-12, nylon 10, nylon 10-10, nylon 11, nylon 12, copolymers thereof and combinations thereof.

9. The consumable multi-component micro-pellet of claim 6, wherein the at least two distinct components comprises a second component comprising a second thermoplastic material.

10. The consumable multi-component micro-pellet of claim 9, wherein the second thermoplastic material comprises a second semi-crystalline polymeric material selected from a group of semi-crystalline polymers consisting of polyamides, polyethylenes, polypropylenes, polyetheretherketones, olyoxymethylene acetals, polytetrafluoroethylenes, polypheneylene sulfides, polybutylene terephthalates, copolymers thereof, and combinations thereof.

11. The consumable multi-component micro-pellet of claim 9, wherein the second thermoplastic material comprises a second polyamide material selected from a group of polyamide polymers consisting of aliphatic nylon 6, nylon 6-6, nylon 6-10, nylon 6-12, nylon 10, nylon 10-10, nylon 11, nylon 12, copolymers thereof and combinations thereof.

12. The consumable multi-component micro-pellet of claim 6, wherein the at least two distinct components comprises a second component comprising an additive, a modifiers, or a plastic reinforcement material.

13. The consumable multi-component micro-pellet of claim 4, wherein the at least two distinct structural components form a micro-pellet geometry selected from the group consisting of a shell-core geometry, an island in the sea geometry, a wedge geometry, a wedge with hollow core geometry, a stripe geometry, a concerted rings geometry, a snow flake geometry and a logo fibers geometry.

14. The consumable micro-pellet of claim 1, further characterized by the first thermoplastic material being a first semi-crystalline polymeric material having a first peak crystallization temperature, and wherein the second thermoplastic material is a second semi-crystalline polymeric material having a second peak crystallization temperature that is greater than the first peak crystallization temperature.

15. A three-dimensional object built with a powder-based additive manufacturing system, the three dimensional object comprising a plurality of solidified layers each produced with a powder-based additive manufacturing system from a plurality of consumable multi-component micro-pellets, wherein each consumable multi-component micro-pellet comprises at least two distinct components and has an average cross-sectional diameter ranging from 10 microns to 250 microns.

16. The three-dimensional object of claim 15, wherein the consumable multi-component micro-pellets have a bimodal or higher order size distribution.

17. The three-dimensional object of claim 15, wherein the consumable multi-component micro-pellets are configured to be melted and used to form a plurality of solidified layers of the three-dimensional object.

18. The three-dimensional object of claim 15, wherein the at least two distinct components of each multi-component micro-pellet are two distinct compositional components.

19. The three-dimensional object of claim 15, wherein the at least two distinct components of each multi-component micro-pellet are two distinct structural components.

20. The three-dimensional object of claim 15, wherein the at least two distinct components of each multi-component micro-pellet comprise distinct mechanical, electrical, magnetic, thermodynamic, processing, aesthetic or biocompatibility properties.

* * * * *